United States Patent [19]

Offenstadt

[11] Patent Number: 4,511,156
[45] Date of Patent: Apr. 16, 1985

[54] WHEEL SUSPENSION FOR A MOTORCYCLE

[76] Inventor: Eric Offenstadt, 41 rue A. Prachay, 95300 Pontoise, France

[21] Appl. No.: 364,875

[22] Filed: Apr. 2, 1982

[30] Foreign Application Priority Data

Apr. 7, 1981 [FR] France ................................ 81 06966

[51] Int. Cl.³ .............................................. B62K 25/04
[52] U.S. Cl. .................................... 280/276; 180/219; 188/272
[58] Field of Search .................... 280/276, 279, 281 R, 280/277, 688, 703; 180/218, 219, 282, 311, 272

[56] References Cited

U.S. PATENT DOCUMENTS 4,367,882 1/1983 Alexander et al. ................. 280/276

FOREIGN PATENT DOCUMENTS

2900106 7/1980 Fed. Rep. of Germany .
2318778 2/1977 France .
2402575 4/1979 France .
2407855 6/1979 France .
WO82/00445 2/1982 PCT Int'l Appl. ................ 280/703
2052407 1/1981 United Kingdom .

Primary Examiner—John A. Pekar
Attorney, Agent, or Firm—Andrus, Sceales, Starke & Sawall

[57] ABSTRACT

A wheel suspension is disclosed, particularly for the front wheel of a motorcycle. Upon braking resulting in compression of the suspension and consequent rearward movement of the wheel, the compression produces displacement of a rod which in turn expels a given amount of hydraulic fluid which displaces a hydraulic piston which produces angular movement of a brake element providing limited rotation of the applied brakes and the wheel, which enables the wheel to roll along the ground during its rearward travel so as to prevent skidding or loss of adherence.

10 Claims, 11 Drawing Figures

WHEEL SUSPENSION FOR A MOTORCYCLE

DESCRIPTION

The present invention relates to wheel suspensions, in particular for motorcycles, and more particularly for front wheels of motorcycles, of the type comprising, on one hand, a suspension and shock-absorbing assembly which is inclined to the vertical and is interposed between the spindle on which the wheel is rotatably mounted and support means on the frame and, on the other hand, a brake of which one of the two elements, the element to be braked (disc or drum) and the brake lining or pad support (caliper or backplate), is permanently rigid with the wheel. In the most particular case of front suspensions of motorcycles, it is known that the suspension and shock-absorbing assembly is provided double, on each side of the wheel, and constitutes a telescopic fork.

If these suspensions are inclined to the vertical at an angle termed "castor angle" which is usually 25° to 30°, it is, as is known, for reasons of stability. The suspension is upwardly and rearwardly inclined for a front wheel or upwardly and forwardly inclined for a rear wheel.

Figure 1A:
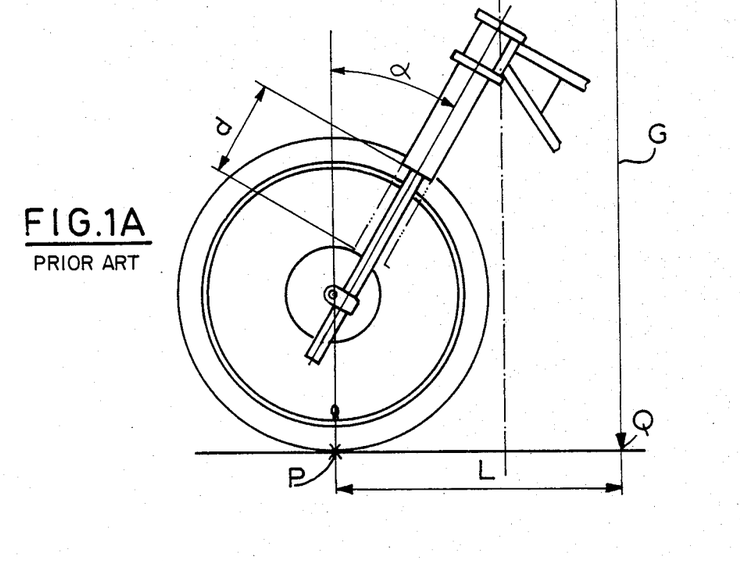
FIGS. 1a and 1b represent diagrammatically the compression phenomenon of the front suspension of a motorcycle of conventional type.
Figure 1B:
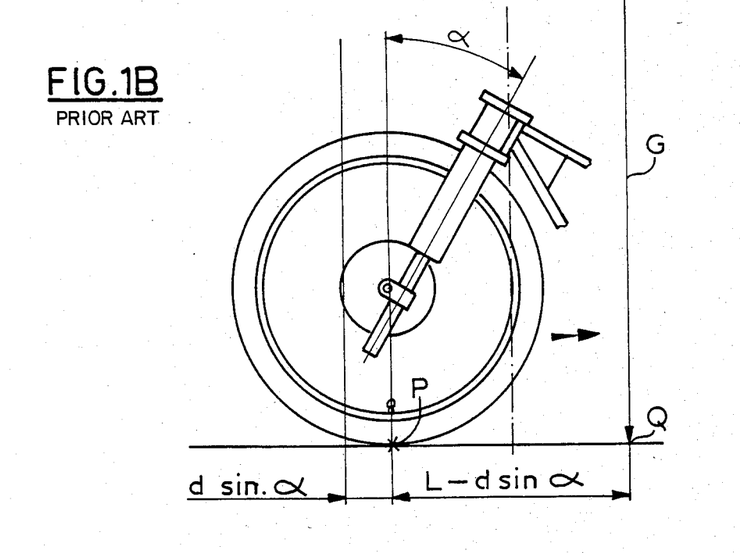

Now, on braking, the load is transferred toward the front and this transfers, for example, 70 to 100% of the mass to the front wheel and this compresses the suspension. This compression results in a relative movement of approach between the wheel and the frame which, as the mass of the front wheel is relatively small relative to the inertial mass of the rest of the motorcycle, results in a rearward movement of the whole wheel without rotation of the latter since it is locked by the brake. The rearward movement of the point of contact with the ground consequently occurs solely by sliding (and not by rolling), with decrease in the distance between the point of contact of the wheel with the ground and the projection onto the ground of the centre of gravity of the rest of the cycle. Thus, as shown in FIGS. 1a and 1b, if L is the distance between the point of contact of the front wheel with the ground and the point Q of projection onto the ground of the centre of gravity G (inertial mass), upon braking on the front wheel, the suspension of the latter is compressed to an extent d along its axis and the point P moves rearwardly on the ground to an extent $d \sin \alpha$ so that the distance PQ becomes $L - d \sin \alpha$, in which $\alpha$ is the angle of inclination of the suspension relative to the vertical. Now, this parasitic rearward movement without rolling happens to be the main cause of bad adherence of the front wheel, above all on wet ground. A similar phenomenon may occur at the rear wheel.

The present invention consequently has for object to reduce this bad adherence of the wheel due to the locking of the latter on braking.

The invention consequently provides a suspension of the aforementioned type, wherein the other element of the brake is mounted to be freely rotatable about the axis of rotation of the wheel and there is interposed between said other element of the brake and the part of the suspension which carries the wheel spindle, a single-acting piston and cylinder unit whose chamber communicates with the chamber of a control element in which is slidable in the direction of the axis of the suspension a member whose solid section is distinctly smaller than that of said piston, one of the two elements consisting of said control element and said slidable member being rigid with the spindle of the wheel and the other with said support means of the suspension on the frame, the two communicating chambers of the cylinder and the control element being filled with an incompressible fluid.

With this arrangement, on braking resulting in a compression of the suspension and consequently a rearward movement of the wheel, this compression produces a relative displacement of the control element and the slidable member which expels a given amount of fluid which displaces the piston relative to its cylinder and consequently produces, between the two parts of the brake, an angular relative movement which allows, notwithstanding application of the brake, a limited rotation of the wheel which enables the latter to roll along the ground during its rearward travel so that any loss of adherence is avoided. Of course, the solid section of the slidable member and that of the piston are in such proportion that the compression travel of the suspension substantially corresponds to the sole angular movement of the wheel which ensures a slide-free rolling thereof in the course of the rearward movement.

In a particularly advantageous embodiment of the invention, it may be arranged that the control element and the slidable member be formed by the two telescopic elements of the suspension itself. This not only avoids employing additional parts and increasing the overall size of the suspension, it also even permits simplifying this suspension itself which usually, in order to compensate for the variation in the volume offered to the oil owing to the depression of the rod or the tube, must have a reverse supply of compressible gas (oleopneumatic suspension) or a snifter valve which allows exterior air to enter and leave (which does not allow such a suspension to be used in an inverted position whereas this might be of utility for reasons of overall size). Indeed, this reverse supply or this snifter valve may be eliminated since the variation of volume is transferred to the piston controlling the angular movement of the wheel. In such an embodiment, the slidable member is preferably formed by the rod which carries the piston-valve of the shock absorber body. In a particular arrangement, the shock absorber body is connected to the axis of rotation of the wheel and the guide sleeve in which this body slides and the valve-carrying rod are connected to the support means of the suspension on the frame.

On the other hand, in another embodiment in which the control element and the slidable member are distinct from the suspension proper, the control element is advantageously carried by the same support as that of the shock absorber body of the suspension and which receives the axis of rotation of the wheel whereas the slidable member is formed by a rod which extends through the end of the control element and is connected to the support means of the suspension on the frame.

Further, whether the control element and the slidable member be distinct from the suspension proper or not, it may be advantageously arranged that the cylinder of the piston be formed by the end of that one of the two elements consisting of the control element or the slidable member which is located in the lower part of the assembly and is connected to the wheel spindle, the piston being slidably mounted in this end in the direction of the axis of the suspension, which avoids machining and fixing a separate cylinder. It may also be arranged that the cylinder of the piston be formed by an added member transverse to that one of the two elements consisting of the control element or slidable member which is located in the lower part of the assembly and is connected to the wheel spindle, the two chambers directly communicating with each other. This piston cylinder may also be formed by a completely separate member and rendered rigid with the axis of rotation of the wheel, the two chambers being then interconnected by a pipe.

It may be advantageously arranged that the piston be connected to the associated brake element through a link which enables the movement in translation of the piston to be converted into an angular movement of the associated brake element. The piston may also be connected to the associated brake element through a transverse oblong stud and slot arrangement which allows the same conversion of movement.

Further features and advantages of the invention will be apparent from the ensuing description of non-limitative embodiments with reference to the accompanying drawings, in which.

Figure 2:
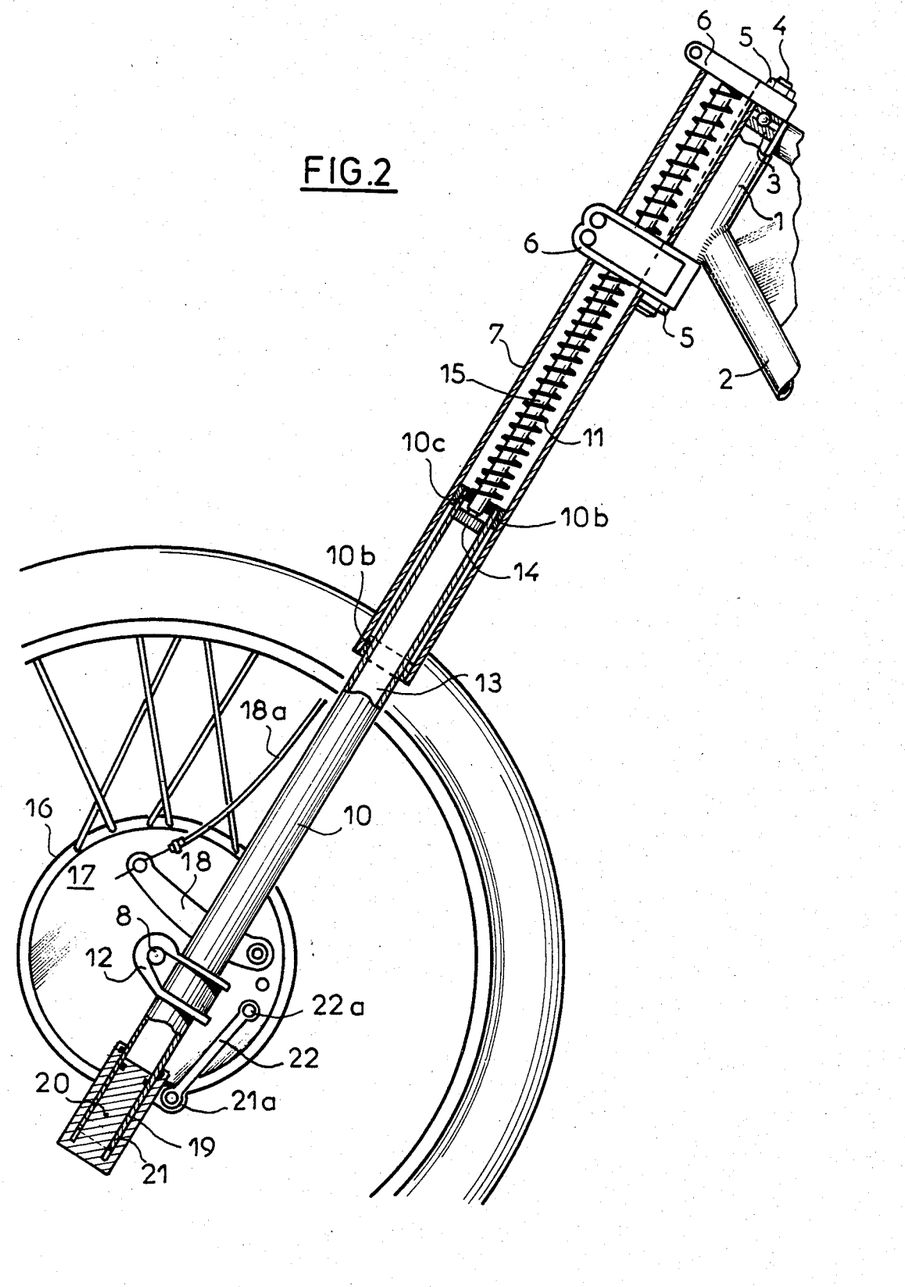
FIG. 2 shows a suspension arranged in accordance with the invention, in a first embodiment of the latter with a piston at the end of a shock absorber and a drum brake.

As shown in FIG. 2, the suspension and shock absorber assembly comprises a guide tube for a steering column 1 which is rigid with the tubular frame 2 of the motorcycle and in which is pivotally mounted by rolling bearings 3 a steering shaft 4 on which are fixed and clamped by nuts 5 two T members of a fork 6 which are disposd above and below the tube. 1. These T members permit the usual mounting of a telescopic fork so that only the elements of the suspension located on one side of the wheel, namely on the front side in the representation of the figures showing the left side of the motorcycle, will be described.

The ends of the two fork T members 6 carry a cylindrical sleeve 7 whose upper end is fixed to the upper T member and extends through the lower T member, this sleeve being oriented, in the same way as the steering shaft 4, at an angle relative to the vertical, namely a castor angle of the order of 30°. This sleeve is extended in the direction of the spindle 8 of the wheel and up to a level higher than the latter.

Mounted telescopically inside the sleeve 7 is a shock absorber body constituted by a tubular element 10 whose upper end is closed by an end wall 10c on which bears the coil spring 11 of the suspension which is under compressive stress and bears at its upper end against the upper fork T member 6, this spring being disposed inside the sleeve 7. At its lower end, the shock absorber body 10 is inserted in a fixing clamp 12 which is rigid with the wheel spindle 8 and extends downwardly and rearwardly so that the body 10 extends behind this spindle 8, this body being moveover extended beyond this fixing 12. The body 10 is slidably mounted in the sleeve 7 with inter-position of two sealing rings 10b.

The shock absorber body is filled with a hydraulic fluid 13 and displaceable through the body is a piston-valve 14 which is fixed to one end of a rod 15 which extends through the end 10a of this body and is fixed at its upper end to the upper fork T member 6 and located within the spring 11.

The suspension described up till now is of a relatively conventional type and is moreover completed by a brake which is of the drum type in this embodiment. This brake comprises a drum 16, which constitutes the hub of the wheel on which the spokes of the latter are mounted, and a circular backplate 17 which is centered on the spindle 8 of the wheel but is not rendered rigid with the shock absorber body 10 as in a conventional brake but is rotatably mounted on the spindle 8. This backplate 17 carries in the conventional manner the brake shoes (not shown) which are applied against the interior of the drum 16 under the action of the control lever 18 driven by its cable 18a.

The shock absorber 10-14 is of a purely hydraulic type, ie. the whole of its inner cavity is filled with hydraulic fluid and no reserve supply of compessible gas is supplied and there is no snifter valve for compensating for the volume of the rod 15 which extends into the body 10.

The lower end of the body 10 constitutes a cylinder 19 in which is slidably mounted a piston 20 which is of the same section and extends beyond the end of the cylinder which is open and is rigid with a guide cap 21 which surrounds the end of the body 10 and is slidable on the latter with the interposition of a sealing element.

The peripheral portion of this cap 21 has a rearwardly extending lug 21a on which is articulated one end of a link 22 whose other end is articulated on one of a series of adjustable fixing points 22a provided on the backplate 17 of the brake at the rear of the wheel spindle 8.

The suspension just described operates in the following manner:

In the non-compressed position of the suspension shown in FIG. 2 the piston-valve 14 is in the upper position within the body 10 and the inner cavity of the latter is completely filled with oil and the piston 20 is completely inserted inside the end cylinder 19 of this body, the cap 21 abutting against the end of the body.

Figure 2A:
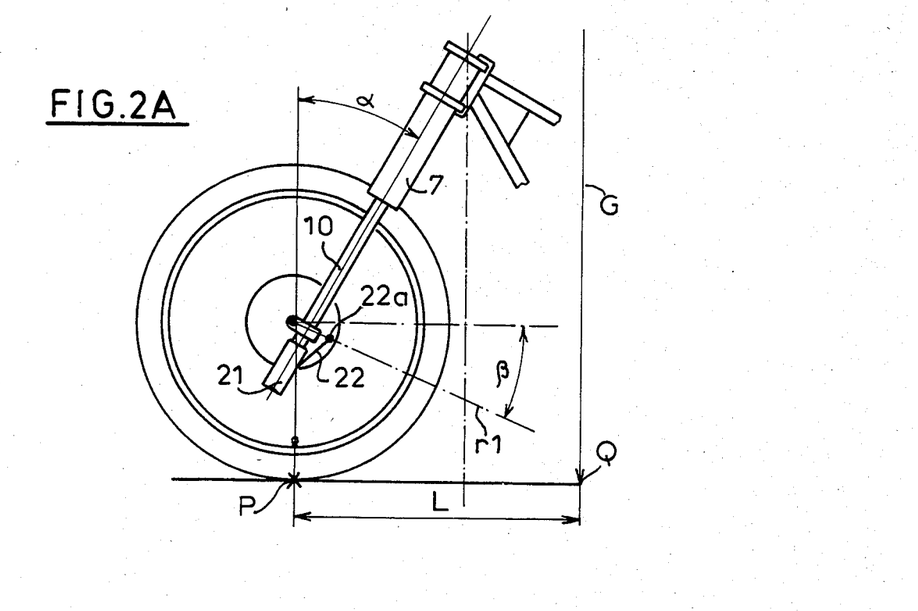
FIGS. 2a and 2b show the operation of such a suspension when it is compressed.

In this non-compressed position of the suspension, it is the point P of the tyre of the wheel which is in contact with the ground. The fixing point 22a of the link on the brake backplate is disposed in a radial direction $r_1$ (angle $\beta$ relative to the horizontal FIG. 2a.

Figure 2B:
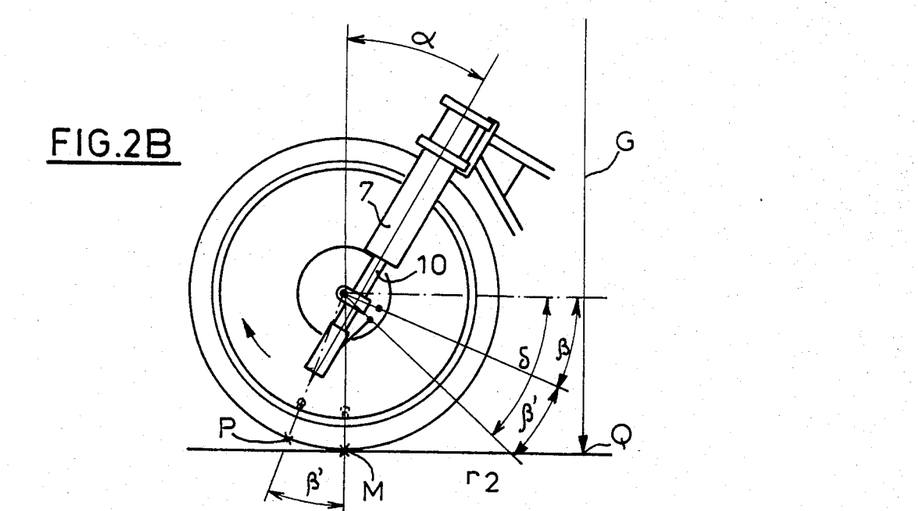

When the suspension is compressed under the effect of a braking applied by means of the brake 16-17, the suspension assumes the new arrangement shown in FIG. 2b. The sleeve 7 has moved downwardly practically without advancing owing to the fact that the body 10 has moved therein whereas, on the other hand, the wheel has moved rearwardly and its point of contact with the ground reaches a position M located at the rear of the preceding position.

However, owing to the presence of the piston 20, when the suspension is compressed and the rod 14 enters the interior of the body 10, its section which enters this body displaces a given body of oil which displaces correspondingly the piston 20 but however with a much smaller travel owing to the proportion between the section of the rod 14, which is relatively small, and the section of the piston 20 which corresponds to the total section of the body 10. This rearward movement of the piston 20 shifts the link 22 which brings about an angular movement of the backplate 17 corresponding to an angle $\beta'$ which brings its fixing point 22a to a new radial orientation $r_2$. As the brake is now applied, this rotation through angle $\beta'$ of the backplate 17 is transmitted through the brake shoes and the drum 16 to the whole of the wheel which has consequently itself undergone a rotation through angle $\beta'$ bodily while moving rearwardly. Consequently, the point P of the tire which was previously in contact with the ground is raised forwardly owing to the rotation of the wheel and it is another point M of the tire which comes in contact with the ground. The dimensions of the various elements are such that the angle $\beta'$ very precisely corresponds to the curvilinear abscissa between the points P and M which allows the wheel to move with a perfect rolling action on the ground during its rearward movement and not a sliding movement which results in a loss of adherence as in known suspensions.

It is therefore clear from the foregoing that the compression of the suspension occurs with a perfect maintenance of the wheel in contact with the ground without sliding so that any loss of adherence is avoided.

Figure 3:
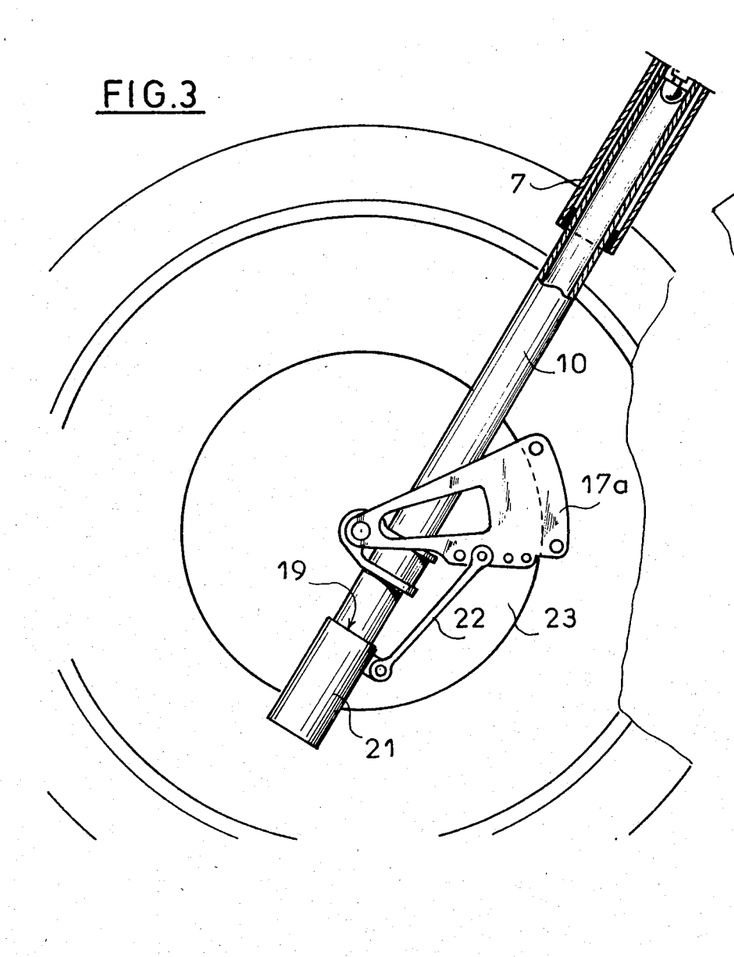
FIG. 3 shows a modification of this embodiment comprising a piston at the end of a shock absorber in the case of a disc brake.

In the modification shown in FIG. 3 the drum brake 16–17 of FIG. 2 is replaced by a disc brake comprising a brake disc 23 which is mounted to rotate with the wheel and a brake pad carrying caliper 17a which is mounted to be rotatable about the spindle 8 of the wheel and extends upwardly and rearwardly so that, as no modification has been made in the suspension of FIG. 2, including the piston 20 and the link 22, the latter can have a fixing point 22a which has the same disposition and orientation as in the preceding embodiment, but with this fixing point provided on one of the two support arms of the caliper 17a. As in the preceding embodiment, a series of fixing points may be provided along said support arm so as to permit an adjustment.

Figure 4:
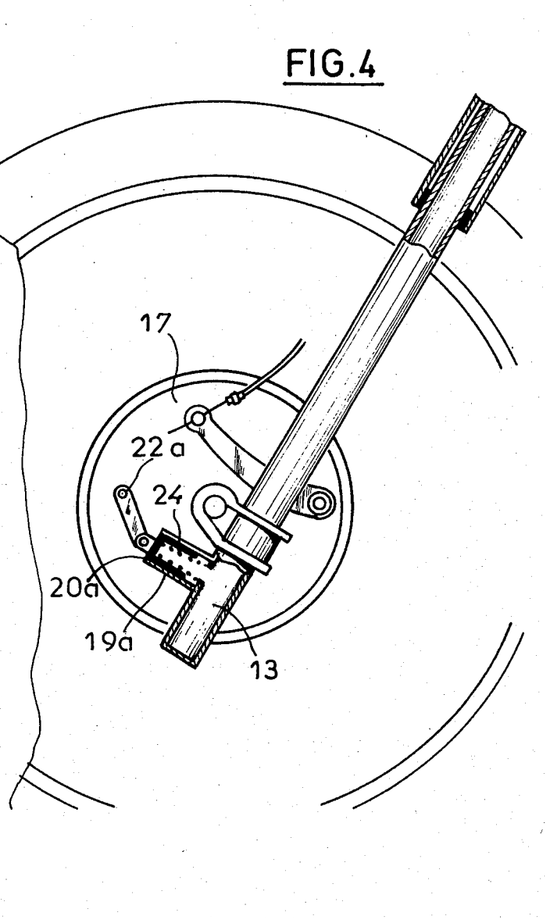
FIG. 4 shows a suspension in accordance with a second embodiment of the invention and having a piston disposed laterally relative to the shock absorber with a drum brake.

In the second embodiment shown in FIG. 4, the end of the shock absorber body 10 is closed and there is moreover provided a piston cylinder 19a which is welded laterally to the body 10 between the fixing means 12 and its lower end so as to by substantially perpendicular to the body 10. This cylinder 19a has an inner chamber 24 which freely communicates throughout its section with the inner cavity 13 of the body 10. This cylinder is open at its opposite end and extending therethrough is a piston 20a which is slidable inside the cylinder and has a free end portion which carries a lug on which a link 22 is articulated. The latter extends upwardly and forwardly in the same way as the cylinder 19a and is itself articulated at its other end at one of a series of fixing points 22a on the drum brake backplate 17.

This cylinder-piston unit operates in a manner similar to the embodiment of FIG. 2, the movement in translation of the piston 20a caused by the compression of the suspension, and the sending of a certain amount of oil into the cavity 24 of the cylinder 19a being converted, through the link 22 into a movement of rotation of the point 22a and of the brake backplate 17. In the same way as in the preceding embodiment, it is a clockwise movement which is imparted to this backplate, but in this second embodiment, owing to the transverse orientation of the cylinder and piston, the assembly must be disposed with the link extending forwardly and not rearwardly as in the embodiment of FIG. 2 so as to permit this clockwise rotation.

It is interesting to note that in all these embodiments the force exerted by the reaction of the link 22 on the piston 20 or 20a will moreover exert a certain resistance to the depression or downward movement of the telescopic fork on braking, so that the device also performs an anti-plunging function which has a favorable effect on the maintenance of the attitude or angular position of the motorcycle. If however the value of this anti-plunging force is found to be excessive for the comfort, it would be possible to add a small compensating coil spring 25 which is disposed inside the cylinder (as shown in FIG. 4) between the piston 20a and a support point on the body 10, it being understood that this spring could just as well be disposed around the cylinder or elsewhere between the point 22a of the articulation of the link and the sleeve 7.

Figures 5, 8:
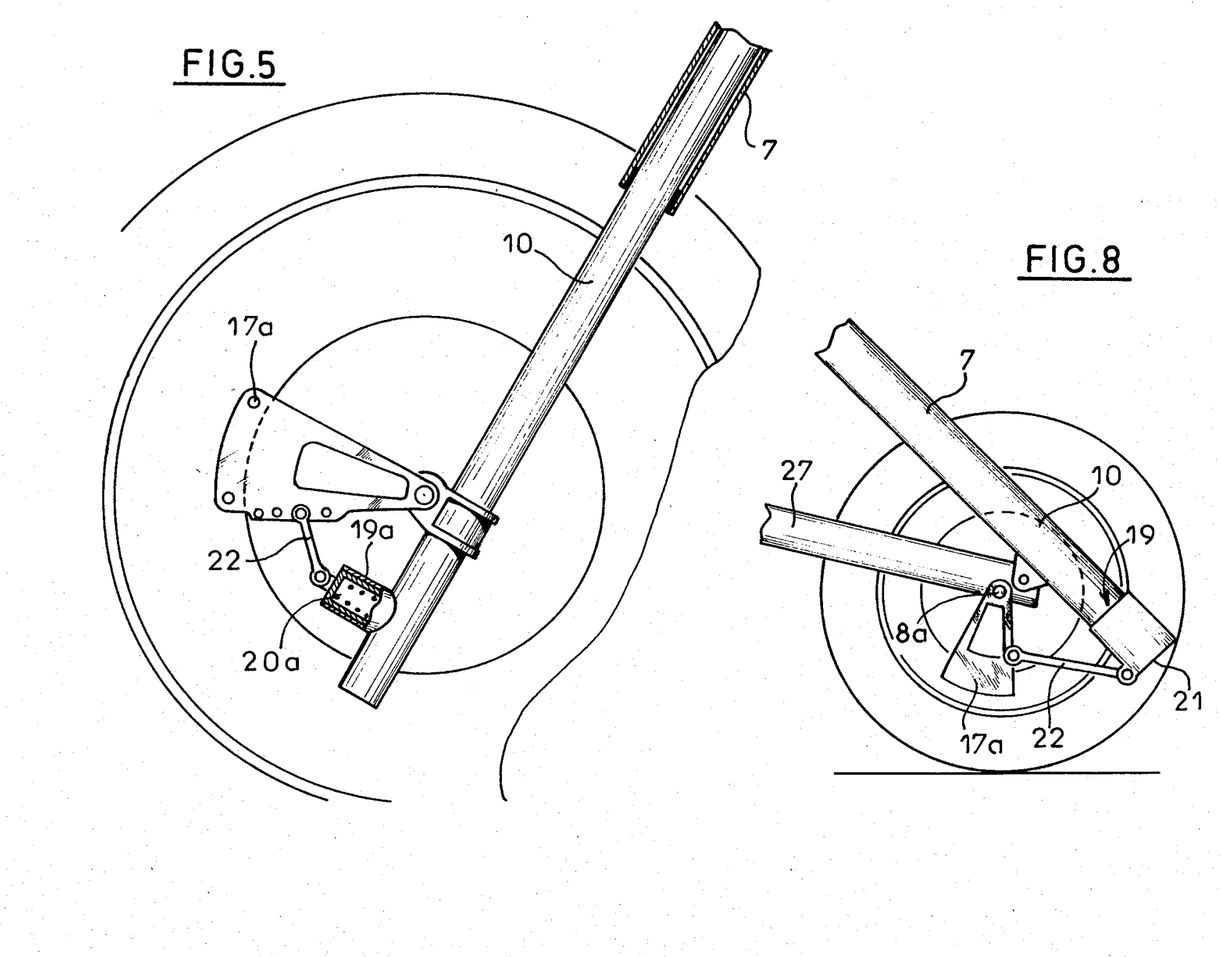
FIG. 5 shows a modification of this embodiment in the case of a disc brake.
FIG. 8 illustrates an application of the invention to a motorcycle rear wheel suspension.

In the modification shown in FIG. 5, only the drum brake of FIG. 4 has been replaced by a disc brake as in the embodiment of FIG. 3, the caliper 17a being however in this case oriented to extend forwardly and upwardly so as to be suitably acted upon by the link 22 which itself extends forwardly with the cylinder 19a.

Figure 6:
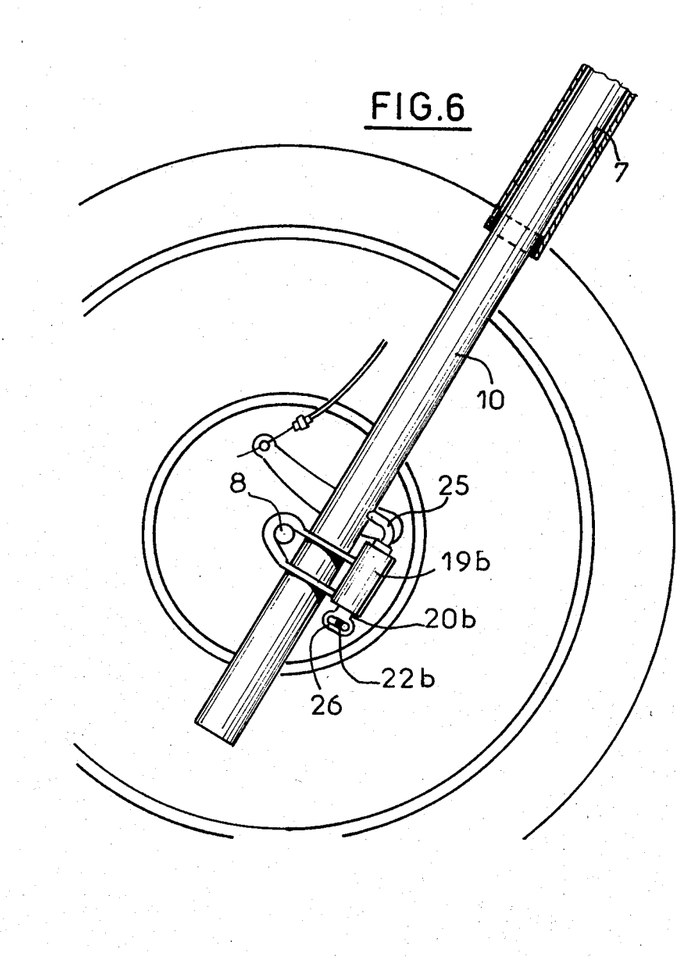
FIG. 6 shows a third embodiment of the invention with a piston separate from the body of the shock absorber in the case of a drum brake.

In the third embodiment shown in FIG. 6, the cylinder 19b is constructed in the form of a distinct element and separate from the body 10 of the shock absorber. This cylinder has a closed end which is connected by a pipe 25 to the lower part of the body 10 so as to put the inner cavity 24b of the cylinder in communication with the inner cavity 13 of the body. This cylinder is arranged to have its open end facing forwardly and downwardly so that the piston 20b extends downwardly out of this cylinder. This piston carries a lug which defines a transverse oblong slot 26 in which is movable a finger member 22b which constitutes a fixing point on the backplate 17 of the drum brake (or optionally on the caliper 17a of a disc brake). The transverse movement of the finger member 22b in the slot 26 enables the linear movement of the piston 20b to be converted into a movement of rotation of the finger member 20b and consequently of the whole of the brake and wheel.

Figure 7:
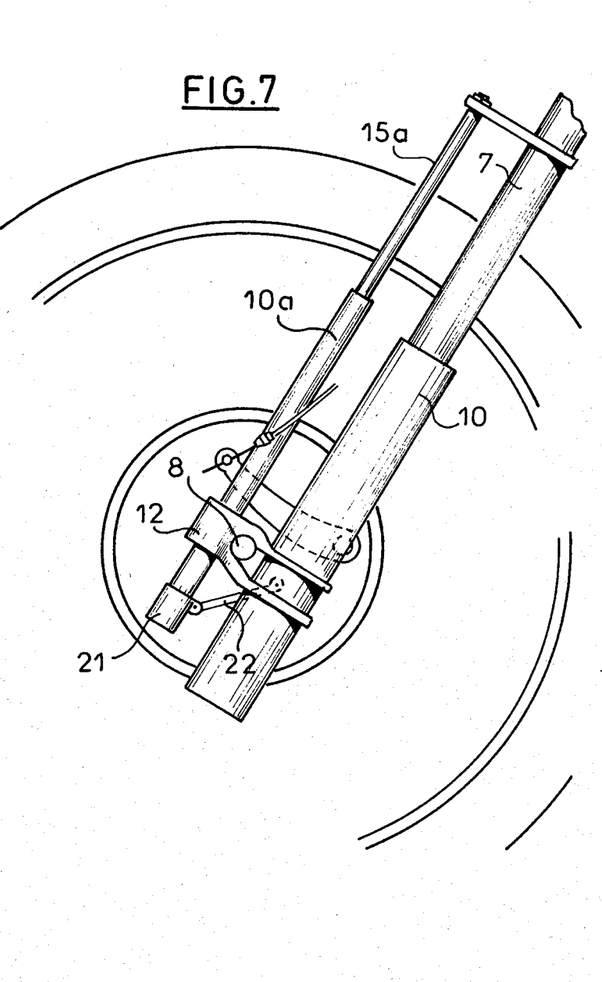
FIG. 7 shows a fourth embodiment of the invention in which the component parts of the latter are arranged separately from the conventional shock absorber.

In the fourth embodiment shown in FIG. 7, there is provided, apart from the normal suspension constituted by the sleeve 7 and the shock absorber body 10 which slide one inside the other and which are exclusively filled with a hydraulic fluid, another assembly comprising a rod 15a slidably mounted to move through the end of a hollow cylindrical body 10a, whereas the free end of the rod 15a is fixed either to the lower T member 6 or to the side of the sleeve 7 of the suspension, the lower end of the body 10a being maintained by the same fixing means 12 as the suspension itself on the spindle 8 of the wheel. The assembly comprising the rod 15a and the body 10a extends in a direction parallel to the axis of the suspension proper 7–10 and on the other side thereof with respect to the spindle 8, and the lower end of the body 10a is arranged in the same way as the end cylinder 19 of the embodiment shown in FIG. 2, with a slidable mounting of a piston 20 that a link 22 articulates on the brake backplate 17 or the caliper 17a of the brake. In this embodiment, the suspension is mounted in an inverted manner, ie. it is the sleeve 7 located in the upper part which slides inside the body 10 located in the lower part.

FIG. 8 shows a rear wheel suspension of a motorcycle in which the wheel 9a is mounted on a spindle 8a located at the rear end of a suspension arm 27. The suspension has an arrangement similar to that shown in FIG. 2, with a sleeve 7, a body 10, a rod 15 and a spring 11. However, this suspension is oriented to extend downwardly and rearwardly so that the end of the body 10 which constitutes the cylinder 19 is located below and at the rear of the spindle 8a. The piston 20, which is axially slidable in the cylinder 19, is connected through a link 22 to the pad-carrying caliper 17a which cooperates with the brake disc 23, this caliper extending radially downwardly and slightly forwardly so that the rearward movement of the piston 20 in the cylinder 19 is converted into a rearward movement of rotation of the caliper 17a and consequently into a counterclockwise movement of rotation of the wheel which causes the latter to roll forwardly when the suspension is compressed.

I claim:

1. A suspension device for a wheel of a vehicle such as in particular a motorcycle, said suspension device comprising:

a spindle on which the wheel is rotatably mounted, support means for mounting the suspension device on a frame of the vehicle, a structure comprising a suspension and shock absorber assembly which is operative along an axis inclined to the vertical and is interposed between and connected to the spindle and the support means, a first element and a second element, one of said first and second elements being a control element with a cavity portion and the other of said first and second elements being a slidable member slidable in the control element in a direction parallel to said axis, the control element and slidable member defining therebetween a chamber in said cavity portion in said control element, one of said first and second elements being rigid with the wheel spindle and the other of said first and second elements being rigid with the support means, a brake comprising two elements comprising an element to be braked and a support for brake linings or pads, one of said two brake elements being permanently rigid with the wheel and the other of said two brake elements being mounted to be freely rotatable about the spindle, a single-acting piston and cylinder unit having a cavity portion and defining therebetween a chamber in said cavity portion in said cylinder and interposed between and connected to said other element of said two brake elements and said one of said first and second elements which is rigid with the wheel spindle, means putting said cylinder chamber in communication with said chamber in the control element and said means and said chambers being filled with an incompressible fluid, the slidable member having a solid cross section which is distinctly smaller than the solid cross section of said piston, such that upon braking of said vehicle resulting in compression of said suspension and shock absorber assembly and rearward travel of said wheel, said compression produces relative displacement of said control element and said slidable member which is transmitted by said fluid to cause relative displacement of said piston and cylinder to produce angular movement of said other of said brake elements about said spindle to rotate said one brake element and said wheel, to enable said wheel to roll along the ground during said rearward travel.

2. A suspension device according to claim 1, wherein the control element and the slidable member are formed by two telescopic elements of the suspension itself, the latter being of the purely hydraulic type.

3. A suspension device according to claim 2, wherein the slidable member is formed by a rod which carries a piston-valve of the shock absorber and extends through an end of a body of the shock absorber.

4. A suspension device according to claim 3, wherein the shock absorber comprises a guide tube in which the body is slidable and the body is rigid with the spindle of the wheel and the guide tube and said rod are rigid with the support means.

5. A suspension device according to claim 1, wherein the shock absorber has a body, the control element and the shock absorber body and is mounted on the wheel spindle, the slidable member being constituted by a rod which extends through an end of the control element and is rigid with said support means.

6. A suspension device according to claim 1, wherein the cylinder of the piston and cylinder unit is constituted by an end portion of that one of said first and second elements which is located in a lower part of said assembly and is rigid with the wheel spindle, the piston being slidably mounted in said end portion in a direction parallel to said axis.

7. A suspension device according to claim 1, wherein the cylinder of the piston and cylinder unit is constituted by a member which is mounted transversely of that one of said first and second elements which is located in a lower part of said assembly and is rigid with the wheel spindle, said two chambers communicating with each other.

8. A suspension device according to claim 1, wherein the cylinder of said piston and cylinder unit is constituted by a member which is completely separate and rigid with the wheel spindle, and pipe means interconnect said two chambers.

9. A suspension device according to claim 1, wherein a link connects the piston of the piston and cylinder unit to the associated brake element whereby a movement of translation of the piston is converted into an angular movement of the associated brake element.

10. A suspension device according to claim 1 wherein means comprising a member defining an oblong slot and a stud slidable in the slot connect the piston of the piston and cylinder unit to the associated brake element.

* * * * *